(12) United States Patent
Yoon et al.

(10) Patent No.: US 10,845,860 B2
(45) Date of Patent: Nov. 24, 2020

(54) POWER CONTROL METHOD AND APPARATUS FOR REDUCING POWER CONSUMPTION

(71) Applicant: Samsung Electronics Co., Ltd., Gyeonggi-do (KR)

(72) Inventors: Taiho Yoon, Gyeonggi-do (KR); Youngyong Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 96 days.

(21) Appl. No.: 16/132,745

(22) Filed: Sep. 17, 2018

(65) Prior Publication Data
US 2019/0086984 A1  Mar. 21, 2019

(30) Foreign Application Priority Data
Sep. 15, 2017  (KR) .................. 10-2017-0118732

(51) Int. Cl.
| | | |
|---|---|---|
| G06F 1/3206 | (2019.01) | |
| H04W 52/02 | (2009.01) | |
| G06F 3/06 | (2006.01) | |

(52) U.S. Cl.
CPC ............ *G06F 1/3206* (2013.01); *G06F 3/067* (2013.01); *G06F 3/0625* (2013.01); *G06F 3/0629* (2013.01); *H04W 52/0206* (2013.01)

(58) Field of Classification Search
CPC combination set(s) only.
See application file for complete search history.

(56) References Cited

U.S. PATENT DOCUMENTS

| | | | |
|---|---|---|---|
| 9,668,102 B1 | 5/2017 | Ananth et al. | |
| 9,668,227 B2 | 5/2017 | Kim et al. | |
| 9,681,487 B2 | 6/2017 | Chatterjee et al. | |
| 2006/0084407 A1* | 4/2006 | Li | H04B 1/1615 455/343.1 |
| 2007/0083778 A1* | 4/2007 | Nagano | G06F 1/206 713/300 |
| 2008/0009328 A1* | 1/2008 | Narasimha | H04W 52/0216 455/574 |
| 2008/0039032 A1* | 2/2008 | Haumont | H04W 8/22 455/115.1 |
| 2009/0279467 A1* | 11/2009 | Ji | H04W 52/0232 370/311 |
| 2013/0107774 A1* | 5/2013 | Wang | H04W 52/0232 370/311 |
| 2015/0119071 A1* | 4/2015 | Basha | G01S 1/68 455/456.1 |
| 2018/0052785 A1* | 2/2018 | Suh | G06F 13/1673 |
| 2020/0045627 A1* | 2/2020 | Wolfe | H04B 7/0413 |

\* cited by examiner

*Primary Examiner* — Raymond N Phan
(74) *Attorney, Agent, or Firm* — The Farrell Law Firm, P.C.

(57) ABSTRACT

Provided are a method and apparatus for adaptively adjusting power in a data center that processes data obtained from radio units functioning as wireless transceivers. The power control method for the data center capable of processing data for each of a plurality of radio units includes identifying whether data is transmitted and received to and from the plurality of radio units communicating with terminals via wireless communication, and performing power control based on a load value calculated using a result of the identifying.

12 Claims, 10 Drawing Sheets

POWER CONTROL METHOD AND APPARATUS FOR REDUCING POWER CONSUMPTION

CROSS-REFERENCE TO RELATED APPLICATION(S)

This application is based on and claims priority under 35 U.S.C. § 119(a) to Korean Patent Application No. 10-2017-0118732, filed on Sep. 15, 2017, in the Korean Intellectual Property Office, the disclosure of which is incorporated herein by reference.

BACKGROUND

1. Field

The disclosure relates generally to a power control method, and more particularly, to a method and apparatus for adaptively adjusting power in a data center that processes data obtained from radio units transmitting and receiving radio signals.

2. Description of Related Art

Since the commercial deployment of fourth generation partnership project (4G) communication systems, efforts have been made to develop improved fifth generation (5G) or pre-5G communication systems to meet the ever increasing demand for wireless data traffic. As such, 5G or pre-5G communication systems are also referred to as "beyond 4G network" or "post long term evolution (LTE) system". To achieve higher data rates, 5G communication systems consider utilization of the mmWave band, such as a 60 GHz band. To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. To improve system networks in 5G communication systems, technology is being developed regarding evolved small cells, advanced small cells, cloud radio access networks (cloud RANs), ultra-dense networks, device-to-device (D2D) communication, wireless backhaul, moving networks, cooperative communication, coordinated multi-points (CoMP), and reception interference cancellation, for example. In addition, advanced coding and modulation (ACM) schemes such as hybrid frequency shift keying (FSK) and quadrature amplitude modulation (QAM) (FQAM), sliding window superposition coding (SWSC), and advanced access technologies such as filter bank multi carrier (FBMC), non-orthogonal multiple access (NOMA), and sparse code multiple access in step SCMA) are also under development for 5G communication systems.

In addition, the Internet is evolving into the Internet of things (IoT) where distributed elements or things process and exchange information. There has also emerged the Internet of everything (IoE) technology that combines IoT technology with big data processing technology through connection with cloud servers. To realize IoT services, base technologies such as sensing, wired/wireless communication and network infrastructure, service interfacing and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Meanwhile, the introduction of machine type communication (MTC), the increase in the number of wireless access terminals due to the popularization of smartphones, and the increase in demand for supporting a high data rate for each terminal have increased the need to efficiently manage radio resources and support higher data rates. To this end, unlike a base station with a conventional distributed architecture where the digital or data unit (DU) and the radio unit (RU) are installed together, base stations having a new architecture where the DU and the RU are separated from each other and the DUs are managed in a centralized manner are emerging. In the conventional architecture, the DUs are typically placed on the cell site.

In this case, for fast packet processing, the base station responsible for the DU function may have to repeatedly determine whether data to be processed is received, in a busy-waiting operation. Even though there is no data to process, the cooling facility may be activated to cool the heat generated by the base station performing the busy-waiting operation, which may result in high power consumption.

As such, there is a need in the art for a method and apparatus that alleviate such overheating at the base station due to this power consumption.

SUMMARY

The present disclosure has been made to address the above-mentioned problems and disadvantages, and to provide at least the advantages described below.

Accordingly, an aspect of the present disclosure is to provide a power control method that can reduce power consumption by adjusting the cycle for repeatedly checking whether data is received according to the amount of data to be processed.

In accordance with an aspect of the present disclosure, there is provided a method of power control for a data center capable of processing data for each of a plurality of radio units, including identifying whether data is transmitted and received to and from the plurality of radio units communicating with terminals via wireless communication, and performing power control based on a load value calculated using a result of the identifying.

In accordance with another aspect of the present disclosure, there is provided a data center capable of processing data for each of a plurality of radio units, including an interface connected with the plurality of radio units by a wired connection, and a controller configured to identify whether data is transmitted and received through the interface to and from the plurality of radio units communicating with terminals via wireless communication, and perform power control based on a load value calculated using a result of the identifying.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1A:
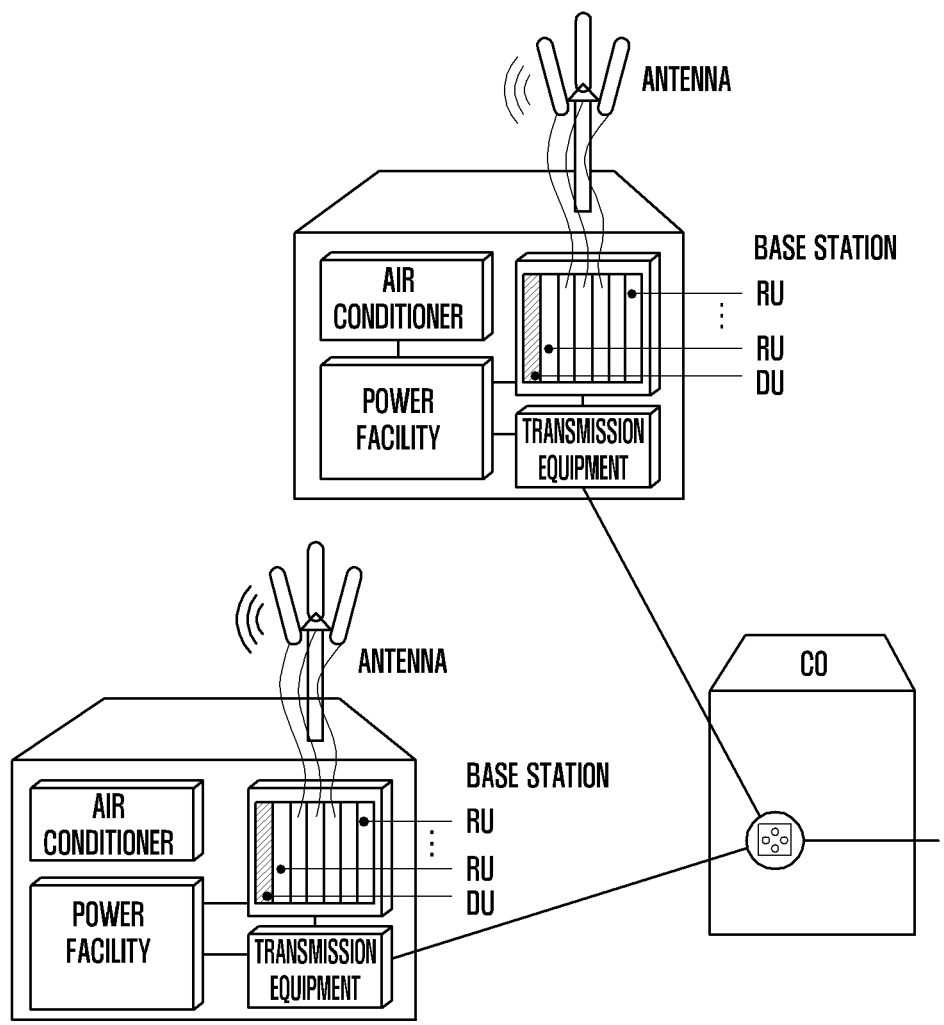
FIGS. 1A and 1B illustrate the architecture of a base station according to an embodiment.
Figure 1A:
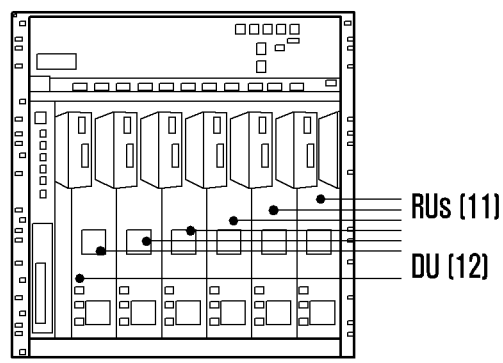

Hereinafter, embodiments of the present disclosure are described in detail with reference to the accompanying drawings. Descriptions of well-known functions and structures incorporated herein may be omitted to avoid obscuring the subject matter of the present disclosure. Particular terms may be defined to best describe the present disclosure; hence, the meaning of specific terms or words used in the specification and the claims should be construed in accordance with the spirit of the present disclosure.

In the following description, it should be understood by those skilled in the art to which the subject matter of the present disclosure pertains is applicable to communication systems having similar technical backgrounds and channel configurations without significant modifications departing from the scope of the present disclosure.

The description of the various embodiments is to be construed as merely examples, and does not describe every possible instance of the present disclosure. The same reference symbols are used throughout the description to refer to the same parts.

Meanwhile, it is known to those skilled in the art that blocks of a flowchart (or sequence diagram) and a combination of flowcharts may be represented and executed by computer program instructions that may be loaded on a processor of a general purpose computer, special purpose computer or programmable data processing equipment. The loaded program instructions, when executed by the processor, create a means for performing functions described in the flowchart. As the computer program instructions may be stored in a computer readable memory that is usable in a specialized computer or a programmable data processing equipment, it is also possible to create articles of manufacture that perform functions described in the flowchart. The computer program instructions, which may be loaded on a computer or a programmable data processing equipment, when executed as processes, may perform steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be simultaneously executed or executed in reverse order.

In the description, words such as "unit" and "module" may refer to a software component or hardware component such as a field programmable gate array (FPGA) or application specific integrated chip (ASIC) capable of performing a function or an operation. However, "unit" is not limited to hardware or software, and may be configured so as to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

In the present disclosure, the operating frequency for repeatedly checking whether data to be processed is received is adjusted according to whether data to be processed is obtained and the pattern in which data to be processed is obtained. Hence, it is possible to reduce the amount of power unnecessarily consumed by repeatedly checking whether data is received although data to be processed is not received.

Figure 1B:
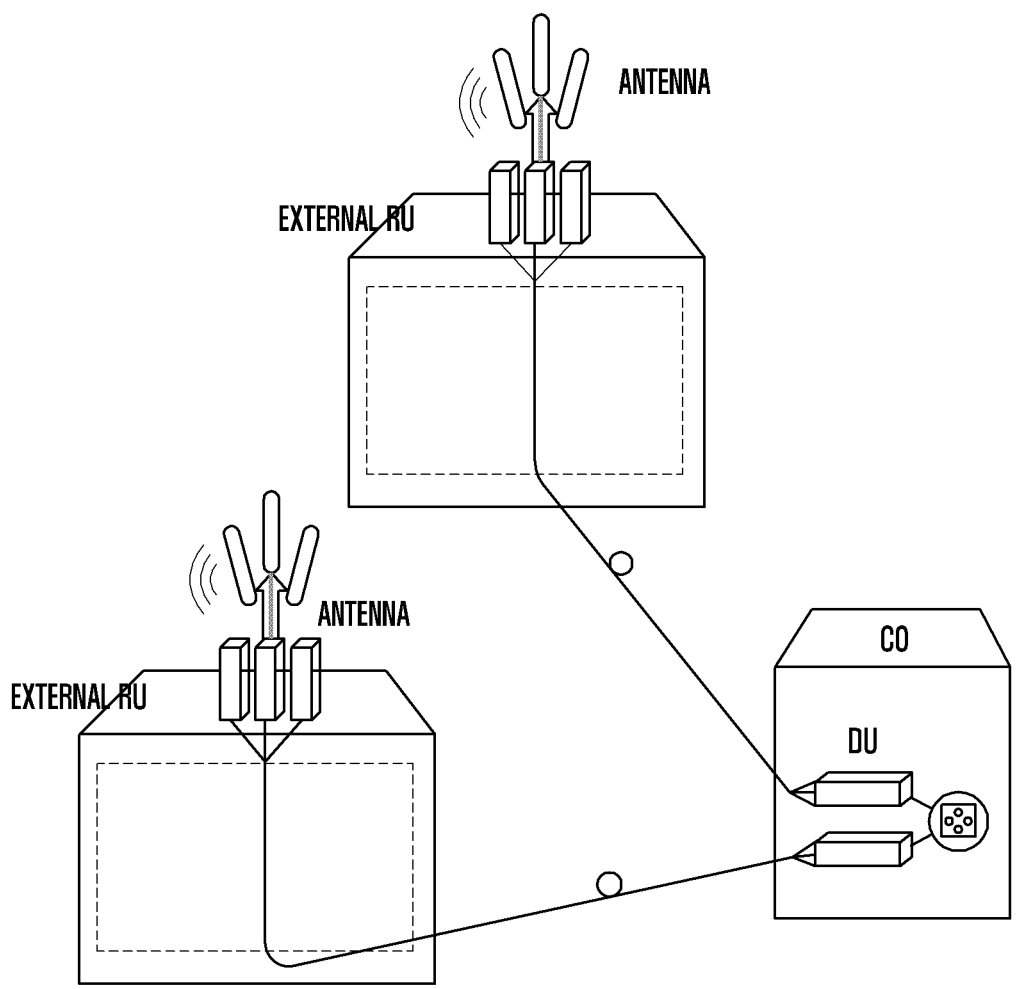

FIGS. 1A and 1B illustrate the architecture of a base station according to an embodiment of the present disclosure.

FIG. 1A illustrates a base station with a distributed RAN architecture, in which the base station 10 shown in FIG. 1A may include a plurality of RUs 11, which perform wireless communication with at least one external device such as a terminal or an electronic device, and a DU 12, which processes data transmitted and received through wireless communication, together. The DU 12 can process data for a plurality of RUs 11 when the plurality of RUs 11 are included in the base station, which is typically deployed at the cell site. For stable power supply and cooling, the power facility and cooling facility are installed in the base station.

Meanwhile, as the communication technology advances, the cell size gradually decreases. To solve the cost problem due to an increase in the number of cell sites, a base station architecture where the RU and the DU are separated from each other has been disclosed. That is, in the centralized RAN architecture shown in FIG. 1B, the RUs 110 for radio signal transmission/reception are installed at the cell sites and the DUs 100 for data signal processing are centrally arranged at one location. The RU 110 performs wireless communication with an external device such as a terminal, and the RUs and DUs are connected via fiber-optic cables (optical interface). The DU 100 being separated from the RU 110 may process data transmitted from the RU 110.

Hereinafter, the terms "radio unit" and "RU" may be interchangeably used, the terms "digital unit", "data processing unit", "DU" and "digital center" may be interchangeably used, and the terms "data", "traffic" and "data traffic" may also be interchangeably used.

Figure 2:
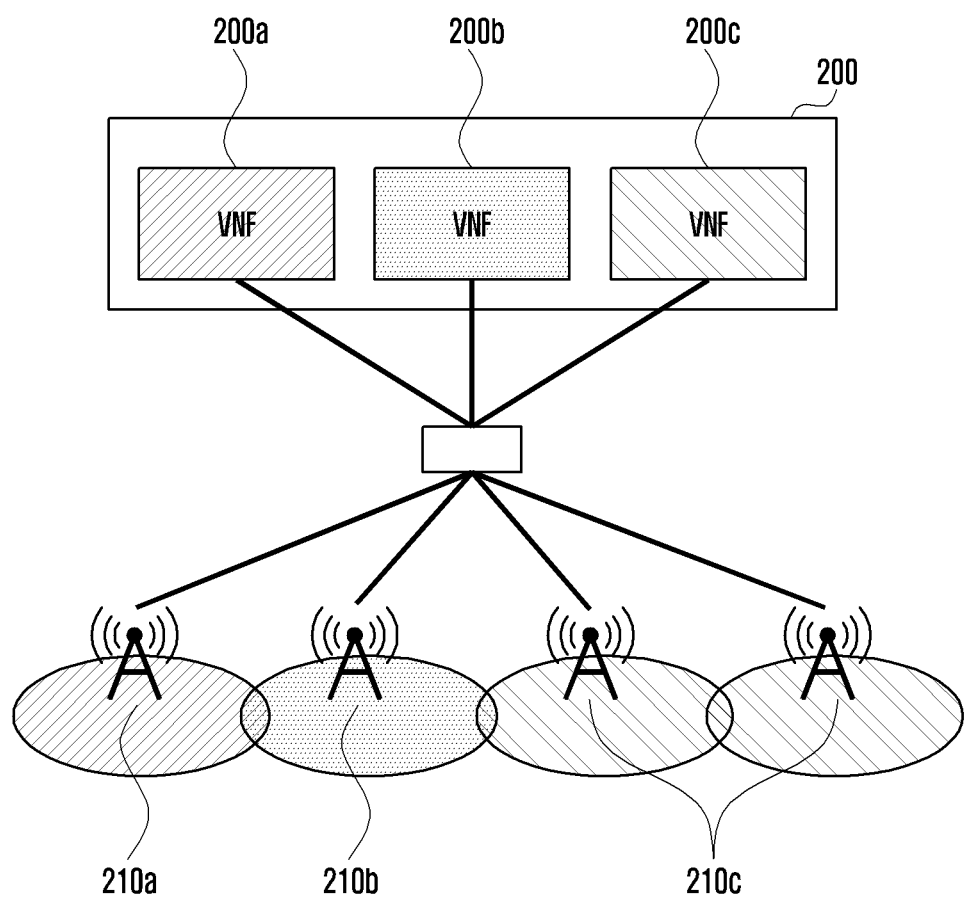
FIG. 2 illustrates a virtual network architecture to which an embodiment is applied.

FIG. 2 illustrates a virtual network architecture to which an embodiment of the present disclosure is applied.

The network related to an embodiment may be implemented in software and provided to a service provider, and may be driven by a multi-core processing unit. That is, the network related to an embodiment may be in the form of a cloud driven by servers, unlike an existing network whose functions are implemented in combination with a specific physical equipment.

In FIG. 2, the RUs 210a, 210b and 210c, which are distinct from each other as illustrated by the different shadings, are deployed at individual cell sites, and the DU 200 is designed so as to be wiredly connected to the RUs 210a, 210b and 210c deployed at the corresponding cell sites through fiber-optic cables. The DU 200 may include virtualized network functions (VNFs) 200a, 200b and 200c, which are also distinct from each other as illustrated by the different shadings and correspond respectively to the RUs 210a, 210b and 210c deployed at the cell sites. Each VNF can process data for the corresponding RU.

For example, one RU 210a may be deployed at a first cell site, one RU 210b may be deployed at a second cell site, and two RUs 210c may be deployed at a third cell site. Each RU 210a, 210b and 210c may transmit data to the DU 200 to process the data obtained through wireless communication with a terminal or the like. The VNFs 200a, 200b and 200c included in the DU 200 may independently process the data for the corresponding RUs 210a, 210b and 210c.

Figure 3:
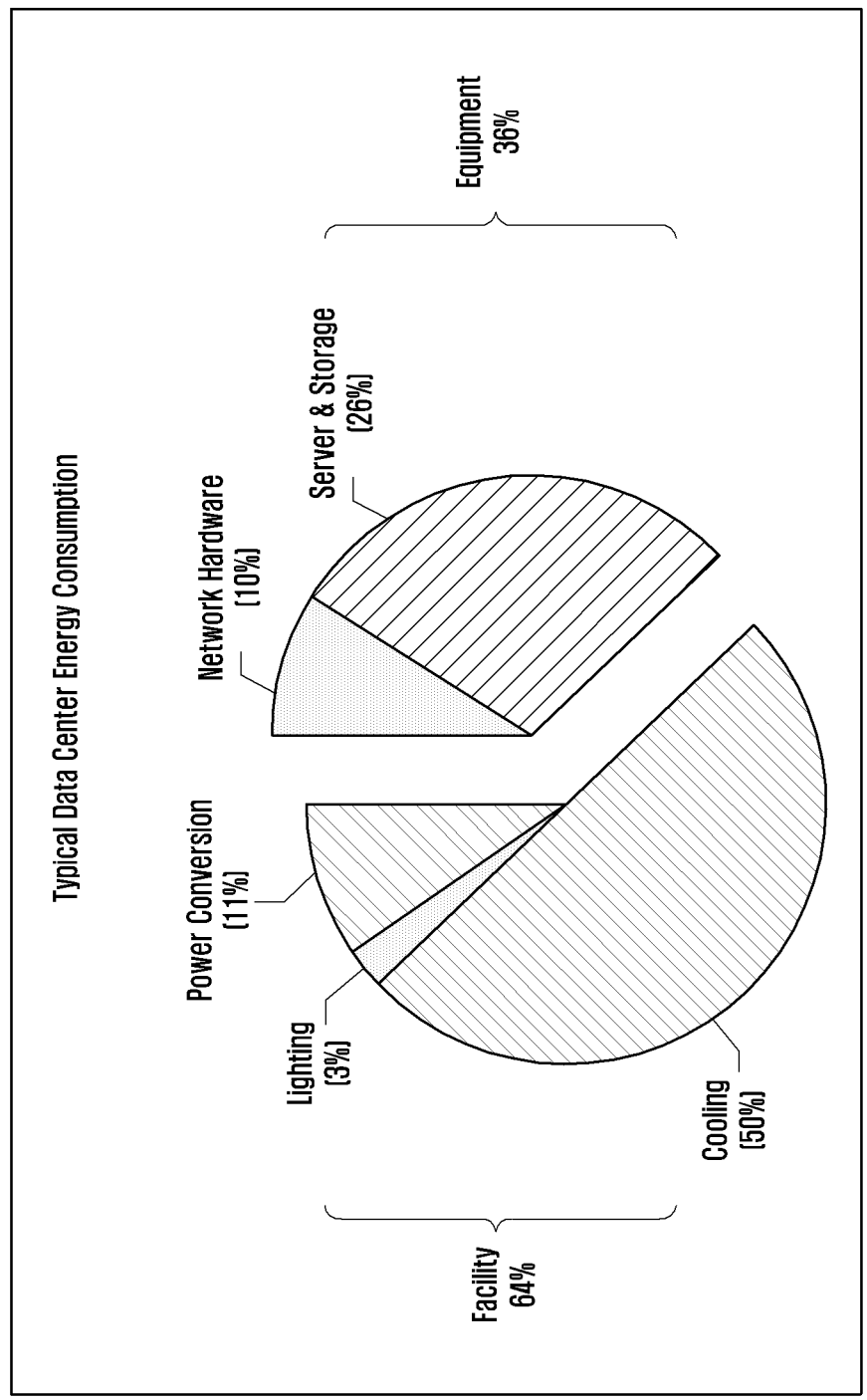
FIG. 3 is a graph representing power consumption in equipment operation at the DU base station, to which the present disclosure is applied.

FIG. 3 is a chart representing power consumption in equipment operation at the DU, to which the present disclosure is applied.

As shown in FIG. 3, in the DU operation, about 36 percent of power is consumed for equipment operation and about 64 percent of power is consumed for facility operation. It is noted that the power consumption due to cooling is the highest (about 50 percent) among the power consumed for facility operation.

These percentages can be interpreted as a result of repeatedly checking whether data is received from the RUs so that the DU can rapidly process the data from the RUs.

More specifically, the DU operates with a specific clock cycle in the busy-waiting state where it continuously checks whether data to be processed is received from the RUs. The RU continuously performing the busy-waiting function generates a lot of heat. For example, the data plane development kit (DPDK) core performs a busy-waiting operation even when there is no data traffic, such as in the idle state.

In this case, to cool the generated heat, the facility installed in the DU continuously operates the cooling system, such as fans, for 24 hours a day, thereby increasing the power consumption. Hence, air conditioning can be first considered to reduce the power consumption of the DU.

Figure 4:
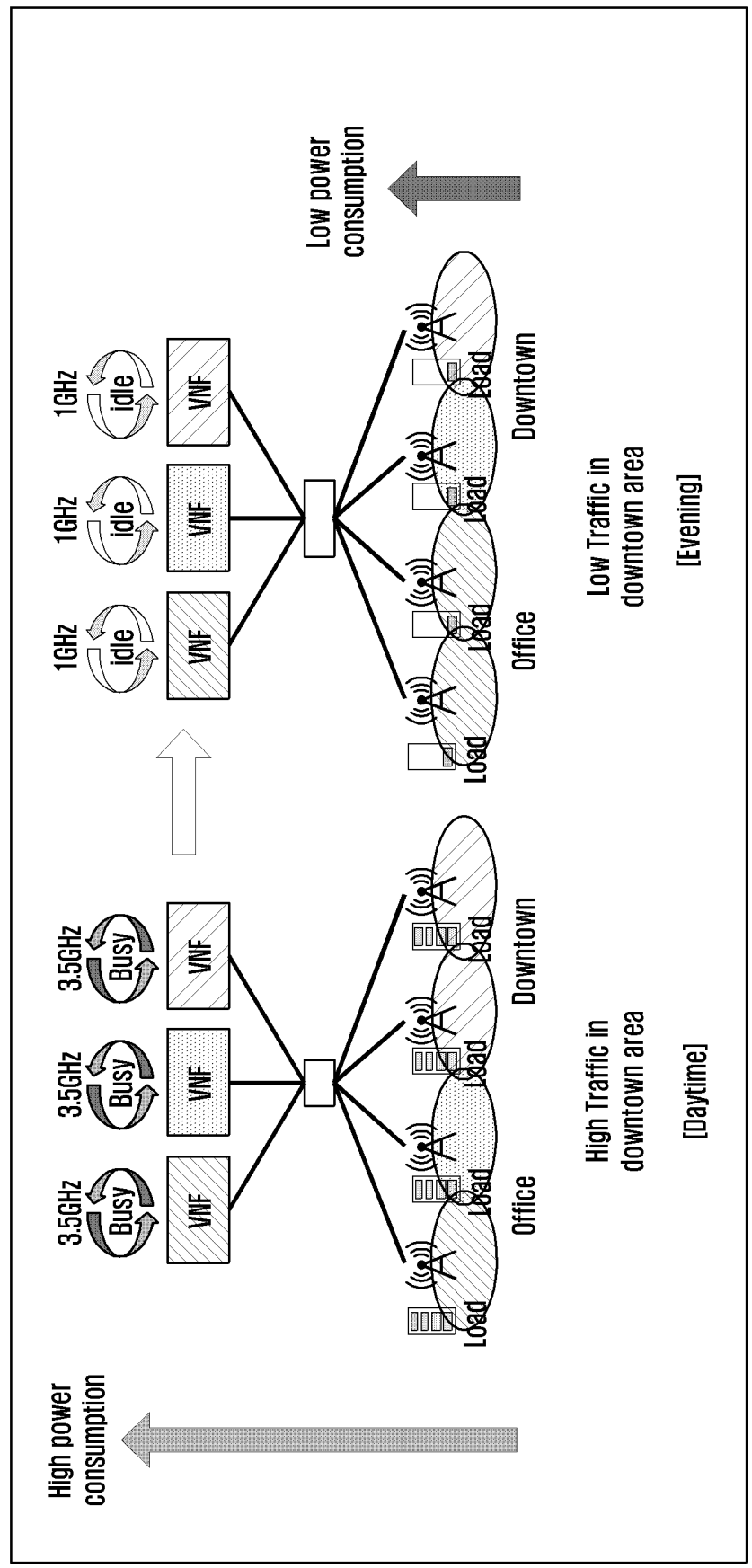
FIG. 4 illustrates the amount of data obtained by the DU base station at different time slots of a day according to an embodiment.

FIG. 4 illustrates the amount of data obtained by the DU at different time slots of a day according to an embodiment.

With reference to FIG. 4, it is possible to roughly estimate the amount of data to be processed at each time slot in a downtown area.

For example, it can be seen that data traffic transmitted and received at each cell site is very high during the daytime. As such, the DU receives in real time a large amount of data from a plurality of RUs and processes the received data. In this case, as shown in FIG. 4, the amount of power consumption due to processing of data received from each RU may be very high.

During nighttime, the plural RUs deployed at the cell sites receive a smaller amount of data in comparison to daytime. As a result, the amount of data to be processed by the DU is reduced. As shown in FIG. 4, the amount of power consumption due to processing of data received from each RU during nighttime may be relatively low.

As shown in FIG. 4, even when the amount of data to be processed is low at certain time slots, the DU continuously performs the busy-waiting operation to check whether data to be processed is received. That is, unlike when a lot of data traffic moves to the DU at a specific time slot, even when there is no data traffic moving to the DU at another time slot, the DU continuously performs the busy-waiting operation, significantly increasing power consumption.

Accordingly, the present disclosure provides an efficient power control method for reducing the power consumption of the DU. For efficient power control, the DU can check the data transmitted from a plurality of RUs and control the power according to the current amount of data traffic determined based on the check result.

For example, as described in FIG. 4, the amount of data traffic may be varied by time slot or region. Hence, the DU may perform efficient power control by distinguishing between when the data traffic is high and when the data traffic is low in consideration of varying data traffic. The DU can perform power control by adjusting the clock frequency of the core, which performs the busy-waiting operation to check whether data is received, according to the amount of data traffic.

More specifically, to determine the current amount of data traffic, the DU may check whether data is transmitted from the RUs communicating with terminals via wireless communication. As described above, to process data transmitted from a plurality of RUs in real time, the DU may be in the busy-waiting state to continuously check whether data is received. Hence, the DU can determine the current data traffic amount by checking whether data is transmitted according to the preset operating frequency.

After determining the current data traffic amount, the DU can calculate the load value of the DU for power control based on the current data traffic amount.

For example, the DU may assume that the transmitted data is to be processed and calculate the load value based on the cycle and time associated with examination of data transmission. In this case, after examining whether data is transmitted according to the preset operating frequency, the DU can calculate the load value by accumulating the number of times that data transmission is or is not detected for a preset time duration. As another example, if the number of times that data transmission is detected during a preset time is greater than or equal to a threshold value, the DU can calculate the load value based on the number of times that data transmission is detected for a given time after the time when the number of times that data transmission is detected is greater than or equal to the threshold value.

As another example, if the number of times that data transmission is detected during a preset time is greater than or equal to a threshold value, the DU can calculate the load value based on the amount of data actually processed for a given time after the time when the number of times that data transmission is detected is greater than or equal to the threshold value.

As another example, the DU may calculate a first load value based on the number of times that data transmission is detected for a given time, calculate a second load value based on the amount of data processed for the given time, and determine the higher of the first load value and the second load value as the final load value.

The DU may perform operations according to the present disclosure by using different cycles for examining whether data is transmitted and received to and from the RUs and for examining whether data is processed. In other words, the DU can check whether data is transmitted and received to and from the RUs every cycle on the basis of the operating frequency, and calculate the load value of the DU according to the operating cycle of a timer.

More specifically, the DU may check whether data is transmitted and received to and from the RUs according to a first cycle associated with the operating frequency, and check whether the transmitted or received data is processed according to a second cycle associated with the operation of the timer.

Various schemes for determining the load value of the DU have been described above. However, in the present disclosure, the method for determining the load value of the DU is not limited thereto.

After calculating the load value, the DU can perform power control according to the calculated load value. As described with reference to FIG. 3, a large amount of power can be consumed by the DU continuously performing the busy-waiting operation to check whether data is transmitted. Hence, in one embodiment, the DU can control the power by lengthening the cycle for checking whether data is transmitted if a relatively low load value is obtained.

Next, a description is given of a power control method of the DU as an embodiment with reference to the drawings.

Figure 5:
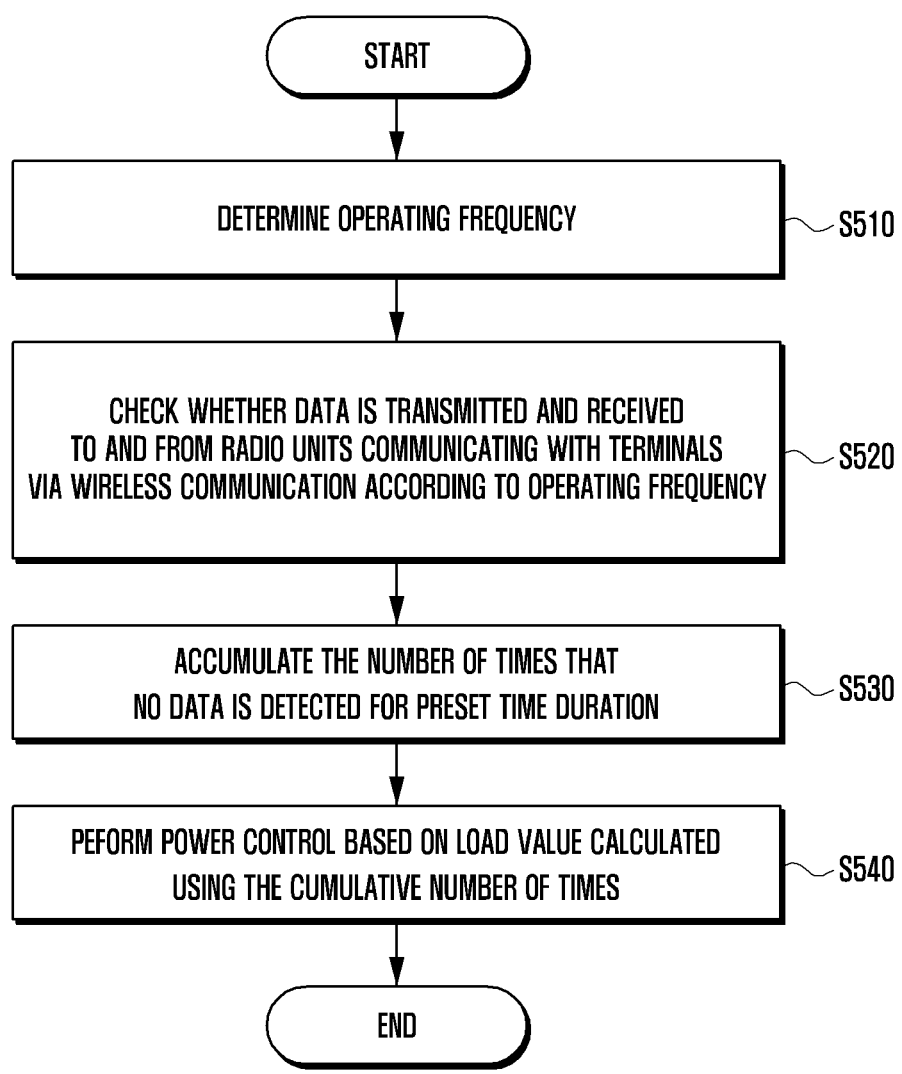
FIG. 5 illustrates a method for the data center to control power using a load value calculated based on the data transmission checking cycle according to an embodiment.

FIG. 5 illustrates a method for the data center to control power using a load value calculated based on the data transmission checking cycle according to an embodiment.

With reference to FIG. 5, the data center may determine the operating frequency with respect to the reference time to check whether data is transmitted and received to and from the radio units in step S510.

The operating frequency may correspond to the clock frequency of the central processing unit (CPU) or core.

The data center can check whether data is transmitted and received to and from the radio units according to the determined operating frequency.

The data center may check whether data is transmitted and received to and from the multiple radio units communicating with terminals via wireless communication according to the determined operating frequency in step S520.

The data center may accumulate the number of times that data transmission is not detected for a preset time duration in step S530.

That is, the data center may check whether data is received for each cycle of the operating frequency during a preset time. For example, when the operating frequency is set to 60 cycles for 1 second, the data center can check whether data is received in each cycle during one second. If no data is detected in a specific cycle, the number of times that data transmission is not detected can be accumulated by increasing the count for the cycle, as will be described later with reference to FIG. 6.

As such, when the number of times of no-data detection is accumulated, the data center can control the power based on the accumulated number of times. For example, the data center may calculate the load value based on the cumulative number of times and control the power based on the calculated load value in step S540.

When data reception is detected, the data center can assume that the received data is to be processed and calculate the load value accordingly. For example, if data is detected in 20 cycles among 60 cycles for a preset time (1 second), the data center can calculate the load value by assuming that data corresponding to the 20 cycles has been processed for one second, as will be described later with reference to FIG. 6.

Power control based on the load value may be performed by, for example, adjusting the operating frequency for checking whether data is detected. Upon determining that the amount of data to be processed for a preset time is large based on the calculated load value, the data center may increase the operating frequency to more frequently check whether data is received. As another example, upon determining that the amount of data to be processed for a preset time is small based on the calculated load value, the data center may decrease the operating frequency to less frequently check whether data is received.

Hereinabove, a description is given of calculating the load value of the DU based on the number of times that data transmission is not detected for a preset time duration. However, the present disclosure is not limited thereto. For example, the DU may calculate the load value on the basis of at least one of the number of times that data transmission is detected for a time duration, the number of times that data transmission is detected for a time duration, and the amount of data processed for a time duration.

As described above, upon determining that the amount of data to be processed is small, the data center can adjust the operating frequency to reduce the power consumed by cooling the heat generated due to the busy-waiting operation.

Figure 6:
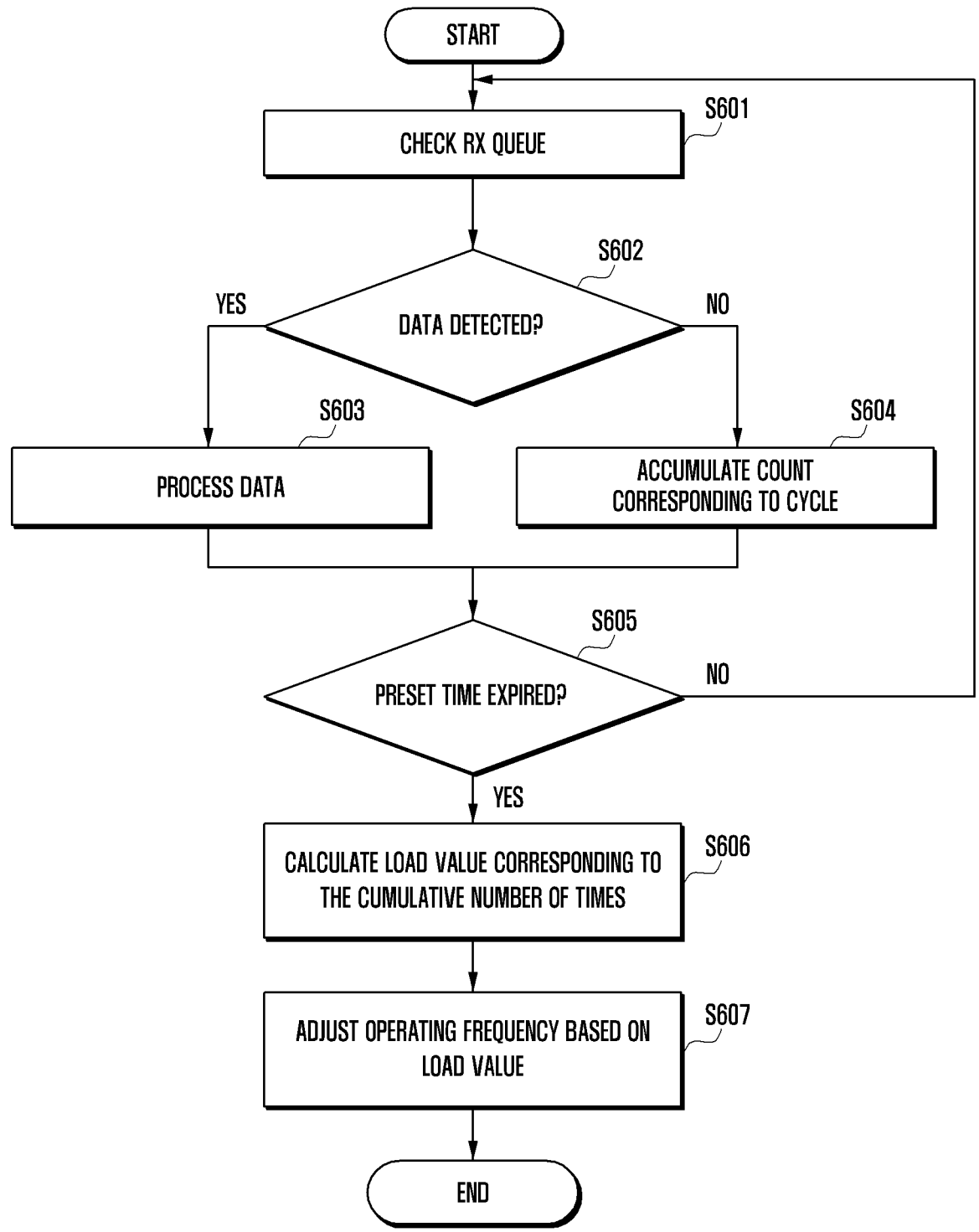
FIG. 6 illustrates a method for adjusting the operating frequency according to an embodiment.

FIG. 6 illustrates a method for adjusting the operating frequency according to an embodiment.

With reference to FIG. 6, the data center can check the receive queue (Rx queue) in step S601.

The Rx queue may refer to an entity that holds the data received from the radio units until the data is moved in the data center for processing.

The data center can determine whether there is data to be processed for every cycle of the determined operating frequency during a preset time by checking the Rx queue in step S602.

If there is data to be processed, the data center may process the detected data in step S603.

If there is no data to be processed, the data center accumulates the count corresponding to the cycle in step S604.

For example, if data to be processed is detected in a particular cycle, the cycle is counted as a single time stamp.

The data center may determine whether the preset time has expired in step S605. If the preset time has not expired, the data center may return to step S601 and repeat checking whether there is data to be processed every cycle. If the preset time has expired, the data center can determine the cumulative number of times that no data is detected for the preset time.

Thereafter, the data center can calculate the load value corresponding to the cumulative number of times that no data is detected in step S606.

The load value may be determined based on the difference between the value of the operating frequency as to the preset time and the cumulative number of times that no data is detected during the preset time.

For example, the data center is assumed to have an operating frequency of 1000 Hz. If no data is detected in any cycle for one second, the cumulative number of times is 1000. If data is detected in 100 cycles out of 1000 cycles for one second, the cumulative number of times that no data is detected is 900.

The difference between the value of the operating frequency (1000) and the cumulative number of times that no data is detected for one second (1000) is zero. The load value can be calculated by converting the difference value (0) into a percentage. In this case, the load value can be zero percent, such as in an idle state.

As another example, when data is detected in 100 cycles out of 1000 cycles for one second, the data center can calculate the load value by converting the difference value between the value of the operating frequency (1000) and the cumulative number of times that no data is detected for one second (900) into a percentage. In this case, the load value can be 10 percent, which may indicate that the core is working at a utilization rate of about 10 percent.

The accumulation of counts and the calculation of the load value described above can be performed based on the code fragment shown in Table 1, as follows.

TABLE 1

```
void Load_Audit_Timer(void)
{
        int ret;
        int lcore = rte_lcore_id( );
            /*load measurement*/
            CoreLoad = (Core_Clock( )-(Work->timestamp)
            *100)/ Core_Clock( );
            Work->timestamp = 0;//init
        Audit_Timer[lcore] = (struct rte_timer
        *)&Audio_Timer_Context[lcore];
        up_timer_init(Audit_Timer[lcore]);
        if(up_timer_reset(Audit_Timer[lcore] ,
1000,UP_TIMER_PERIODICAL,lcore,(r
te_timer_cb_t)UP_Audit_Cb,NULL)<0)
            {
                printf("[%s] timer reset
                error\n",_FUNCTION_);
            }
}
void UP_FastPath_Worker(void )
{
........................
while (!quit_signal)
{
    up_timer_manage( );        //timer management
    /* Rx SRB*/
    ret = rte_ring_dequeue(INPUT_RING_SRB[core_id],&buf);
    if((ret==0) && (buf != NULL)) //No traffic
    {
            <skip>
            CORE_LOAD_COLLECT_IDLE; //per code idle cycle.
        Continue;
    }
    /*traffic processing*/
    CORE_LOAD_UPDATE_BUSY; //update traffic cycle
}
}
```

As shown in Table 1, a preset period of time is used for the loop to check whether data is received every cycle, and it is possible to identify the level of core utilization, such as busy or idle, according to the accumulated count and the load value.

After calculating the load value, the data center can adjust the operating frequency based on the load value for efficient power control in step S607.

For example, upon determining that the load value is high, the operating frequency may be increased (i.e., to more frequently check whether data is received during a given time). Upon determining that the load value is low, the operating frequency may be decreased (i.e., to less frequently check whether data is received during a given time).

In the above embodiment, a timer is run to calculate the load value. That is, the load value is calculated based on the number of times data is detected for a preset time corresponding to one operation period of the timer. In another embodiment, the cycles of the operating frequency of the DU may replace the function of the above timer. For example, the load value may be calculated by setting a load update interval based on the cycles of the operating frequency as described in Table 2 as follows.

TABLE 2

```
while(1)
{
        ..............
        current_cycle = get_cycle( ) //get current cycle
        rte_ring_dequeue(...) <-- identifying state of Rx Queue
        update_coreload(....);
        report_coreload(...load_update_interval...); <-- calculating load
by a unit of load_update_interval
}
```

Figure 7:
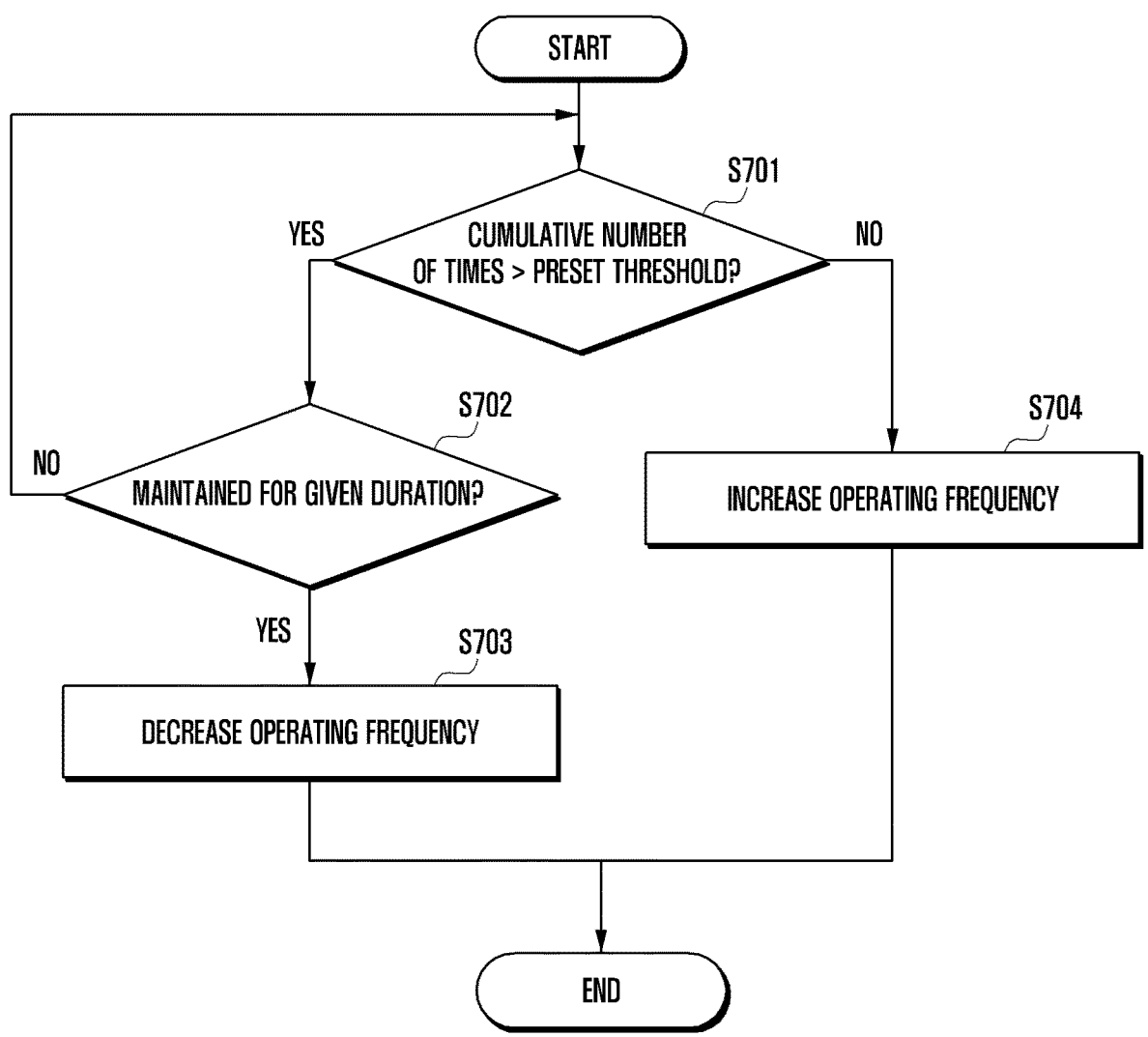
FIG. 7 illustrates a method for adjusting the operating frequency in consideration of a data traffic condition according to an embodiment.

Meanwhile, in one embodiment, the data center can adjust the operating frequency according to whether the cumulative count is maintained for a preset time. That is, since the data traffic may significantly increase at a certain point in time, it may be ineffective to change the operating frequency only by determining that the amount of data traffic has increased. Accordingly, the data center can consider the traffic state due to currently connected terminals and efficiently control the operating frequency according to whether the change in the amount of data traffic is maintained for a preset time. FIG. 7 illustrates a method for adjusting the operating frequency in consideration of a data traffic condition according to an embodiment.

With reference to FIG. 7, the data center can accumulate the number of times that no data is received in accordance with the running period of the timer. The data center can compare the accumulated number of times during a preset time with a preset threshold in step S701.

If the accumulated number of times is greater than the threshold, the data center can determine whether such a state is maintained for a given time duration in step S702.

That is, if the accumulated number of times is high owing to low data traffic, the data center may determine whether this state (low core utilization) is temporary or continuous.

If the state where the accumulated number of times is greater than or equal to the preset threshold is maintained for the given time duration, the data center can determine that the current core utilization is low and decrease the operating frequency in step S703. That is, the data center can adjust the operating frequency so that the number of times of checking whether data is received for the preset time is reduced.

Later, if the number of times that data is received increases again, the data center can gradually increase the operating frequency in proportion to the increasing amount of data.

Otherwise, if the accumulated number of times is less than the threshold in step S701, the data center can increase the operating frequency in step S704.

If the accumulated number of times is low owing to soaring data traffic, the data center can immediately increase the operating frequency without determining whether such a state is temporary or continuous.

That is, when the data traffic suddenly increases, it is necessary to process the increasing data traffic as soon as possible. Hence, the operating frequency is adjusted without determining whether such state is maintained. When the operating frequency is increased, the number of times of checking whether data is received for a given time increases, and the increased traffic can be rapidly processed.

According to the embodiment described above, it is possible to process data traffic with reduced power consumption in consideration of the data traffic condition by time slot or region.

Figure 8:
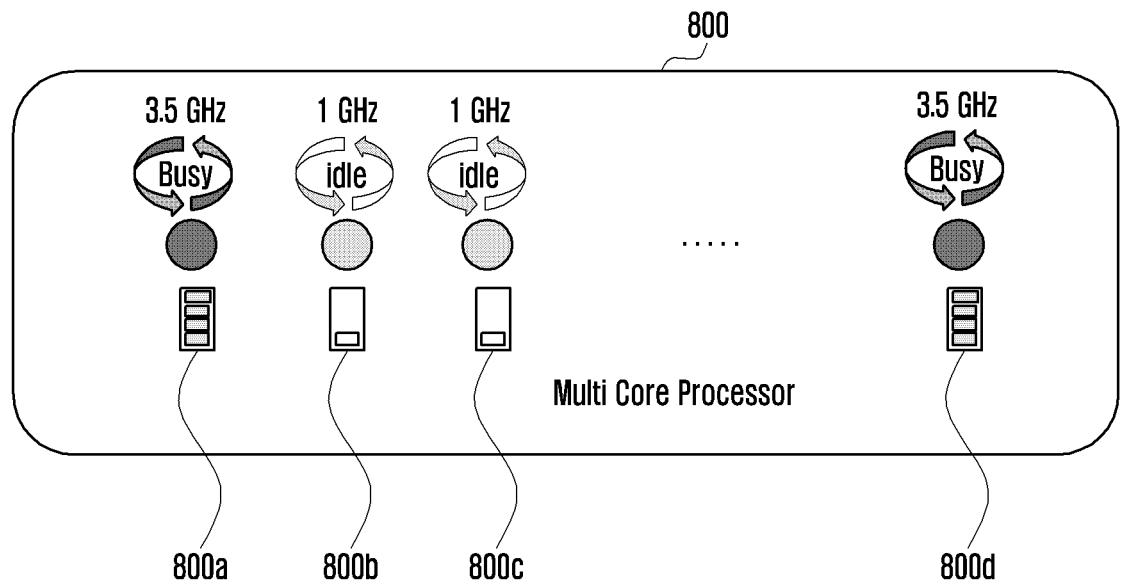
FIG. 8 illustrates a multi-core architecture of the data center according to an embodiment.

FIG. 8 illustrates a multi-core architecture of the data center according to an embodiment.

As described above in FIG. 2, the data center according to an embodiment may include a plurality of VNFs to process data received from radio units deployed at the corresponding cell sites. The plurality of VNFs are configured for data processing in accordance with a plurality of radio units and can independently process data for the corresponding radio units.

For example, in FIG. 8, the VNFs 800a, 800b, 800c and 800d corresponding to different radio units may have different data traffic in the same time slot. Since the data center 800 has a multicore processor architecture, the VNFs are executed at different operating frequencies.

That is, in the data center 800, through adjustment of operating frequencies, the VNFs 800a and 800d with a high amount of data traffic can be executed at a high operating frequency, and the VNFs 800b and 800c with a low amount of data traffic can be executed at a low operating frequency.

Figure 9:
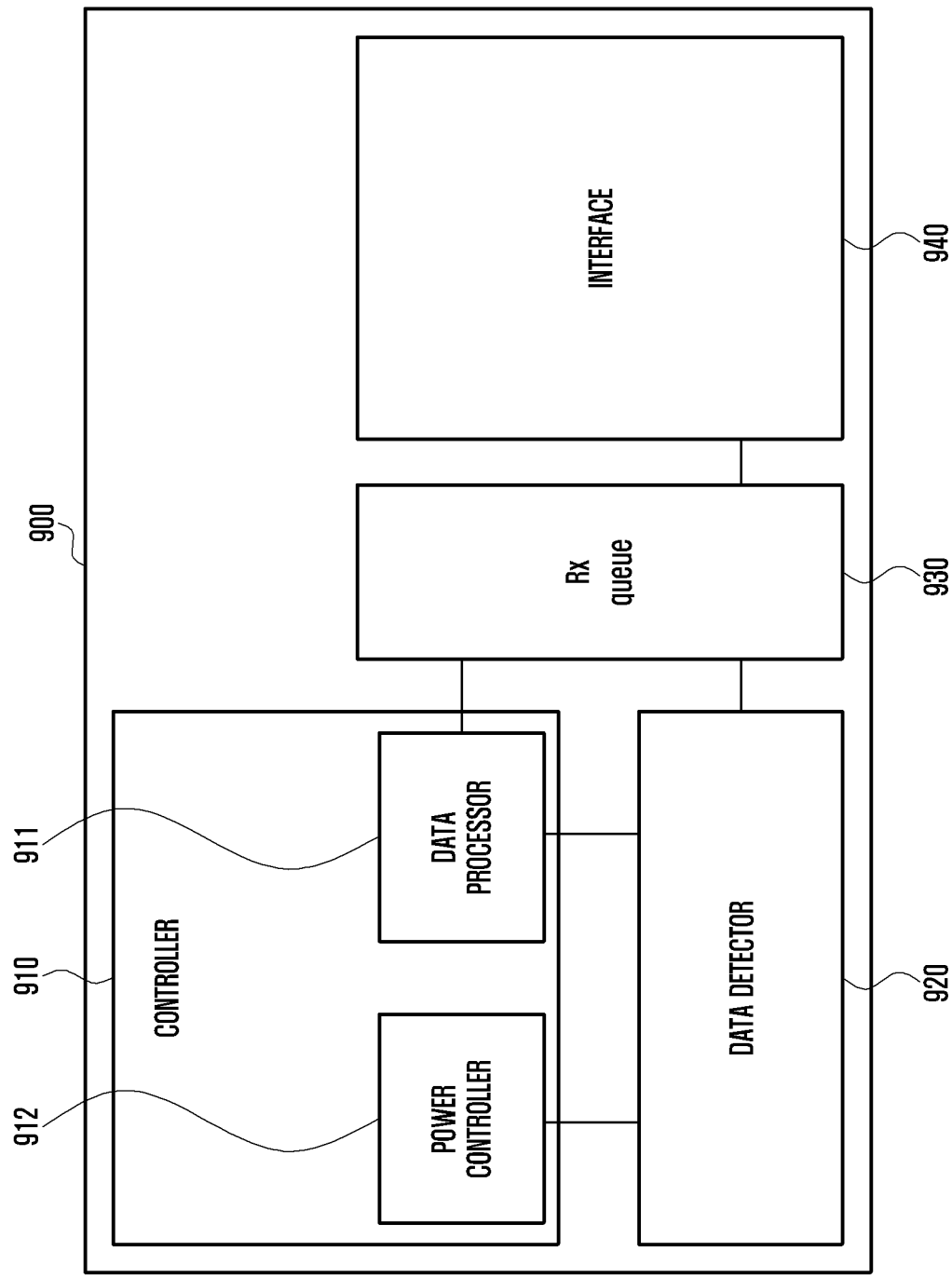
FIG. 9 is a block diagram of a data center according to an embodiment.

FIG. 9 is a block diagram of a data center according to an embodiment.

With reference to FIG. 9, the data center 900 may include a controller 910, a data detector 920, an Rx queue 930, and an interface 940. The controller 910 may include a data processor 911 and a power controller 912.

The interface unit 940 may be connected to a radio unit through a wired connection such as a fiber-optic cable, and may receive data from the radio unit communicating with terminals via wireless communication.

The Rx queue 930 can hold data received through the interface 940 until it is transferred to the data processor 911. Thereafter, the data transferred from the Rx queue 930 to the data processor 911 may be deleted from the Rx queue 930.

The data detector 920 may access the Rx queue 930 according to the operating frequency to check whether data is received. When the operating frequency is changed by the controller 910, the data detector 920 may access the Rx queue 930 according to the changed operating frequency to check whether data is received. In FIG. 9, the data detector 920 is shown as being separate from the controller 910, but the data detector 920 may be included in the controller 910.

When data transmission is detected by the data detector 920, the controller 910 may obtain the transmitted data from the Rx queue 930 and control the data processor 911 to process the data according to a preset rule.

In addition, the controller 910 may increase the count corresponding to the cycle in which no data is detected by the data detector 920 to accumulate the number of times that no data is detected, may calculate the load value based on the accumulated number of times and adjust the operating frequency based on the calculated load value, and may control the data detector 920 to apply the adjusted operating frequency. The power controller 912 may control the power according to the adjusted operating frequency.

The embodiments solve the problem of the data center consuming a lot of power due to cooling (e.g., using fans and air conditioning) the heat generated by the busy-waiting operation. Hence, service providers can reduce the maintenance cost of the data center.

The description of the various embodiments is to be construed as providing only examples and does not describe every possible instance of the present disclosure. Therefore, it should be understood that various changes may be made and equivalents may be substituted for elements of the present disclosure. It should also be appreciated that the present disclosure is not limited to a specific embodiment and all modifications, equivalents, and/or alternatives thereof also belong to the scope of the present disclosure.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method of power control performed by a data center for processing data of a plurality of radio units, the method comprising:
    identifying whether the data of the plurality of radio units exists in a memory based on an operating frequency associated with a number of times to check the data of the plurality of radio units for the memory during a reference time;
    determining a load value based on the identifying; and
    adjusting the operating frequency based on the determined load value,
    wherein the data is received from the plurality of radio units based on wireless communication.

2. The method of claim 1, wherein the load value is determined based on at least one of a first cumulative number of times that no data is detected during the reference time and a second cumulative number of times that the data is detected during the reference time.

3. The method of claim 2,
    wherein the first cumulative number of times is accumulated by increasing a count in a cycle when no data is detected, and
    wherein the load value is determined based on a difference between a value of the operating frequency corresponding to the reference time and the first cumulative number of times determined by a last increased count.

4. The method of claim 2, wherein performing power control comprises:
    comparing the load value with a preset threshold; and
    adjusting the operating frequency if a result of the comparing satisfies a specific condition.

5. The method of claim 4, further comprising:
    increasing the operating frequency if the specific condition is satisfied,
    wherein the specific condition is satisfied when the load value is maintained greater than or equal to the preset threshold during a predetermined duration.

6. The method of claim 4, further comprising:
    decreasing the operating frequency if the specific condition is satisfied,
    wherein the specific condition is satisfied when the load value is less than the preset threshold.

7. A data center for controlling power to process data of a plurality of radio units, comprising:
    an interface connected with the plurality of radio units by a wired connection;
    a memory; and
    a controller configured to:
    identify whether the data of the plurality of radio units exists in the memory based on an operating frequency associated with a number of times to check the data of the plurality of radio units for the memory during a reference time;
    determine a load value based on the identifying; and
    adjust the operating frequency based on the determined load value,
    wherein the data is received from the plurality of radio units through the interface based on wireless communication.

8. The data center of claim 7, wherein the controller is further configured to determine the load value based on at least one of a first cumulative number of times that no data is detected during the reference time and a second cumulative number of times that the data is detected during the reference time.

9. The data center of claim 8, wherein the controller is further configured to accumulate the first cumulative number of times by increasing a count in a cycle when no data is detected, and determine the load value based on a difference between a value of the operating frequency corresponding to the reference time and the first cumulative number of times determined by a last increased count.

10. The data center of claim 8, wherein the controller is further configured to compare the load value with a preset threshold, and adjust the operating frequency if a result of the comparing satisfies a specific condition.

11. The data center of claim 10, wherein the controller is further configured to determine that the specific condition is satisfied when the load value is maintained greater than or equal to the preset threshold during a predetermined duration, and increase the operating frequency based on a determination that the specific condition is satisfied.

12. The data center of claim 10, wherein the controller is further configured to determine that the specific condition is satisfied when the load value is less than the preset threshold, and decrease the operating frequency based on a determination that the specific condition is satisfied.

* * * * *